UNITED STATES PATENT OFFICE.

HANS SCHNEIDER, OF WILMERSDORF, NEAR BERLIN, GERMANY.

DISINFECTANT.

934,844.  Specification of Letters Patent.  Patented Sept. 21, 1909.

No Drawing.  Application filed February 15, 1907.  Serial No. 357,552.

*To all whom it may concern:*

Be it known that I, HANS SCHNEIDER, doctor of philosophy, chemist, a subject of the German Emperor, and a resident of Wilmersdorf, near Berlin, Germany, have invented new and useful Improvements in Disinfectants, of which the following is a specification.

My invention relates to disinfectants which on account of their great capacity for killing bacteria excel all the commonly used disinfectants except corrosive sublimate, and whose effectiveness is nearly as great as that of the latter salt.

I have discovered that by mixing phenol or phenol derivatives or germicidal aldehydes, particularly formaldehyde, with oxalic acid in the manner hereinafter described, a great increase of the disinfecting power takes place. By actual experiment, I have discovered that this increase in disinfecting power is much greater in case of oxalic acid than any other acid known to me, although sulfuric acid, boric acid, and various organic acids have sometimes been used with phenols. This application, however, is restricted to the mixture of oxalic acid with aldehydes and the process of making it.

In carrying out my invention, I take ordinary crystallized oxalic acid and heat it until the water of crystallization is wholly or partially expelled, forming a dry powder. To 100 parts of this powder, I add 25 parts of 40 per cent. aqueous formaldehyde solution, and stir the mixture vigorously, the result being a dry homogeneous powder, which may be easily compressed into tablets and which is easily soluble in water.

This disinfectant may be marketed either in the form of a concentrated solution, or in the form of tablets.

The resulting product is a highly efficient disinfectant, which is particularly suitable for the purpose of disinfection on a large scale and for veterinary purposes. It is also valuable for ordinary medicinal purposes, as for example, for the disinfection of the hands because its solution can be employed in a very dilute form, owing to its great capacity for killing bacteria, so that the injurious caustic effects upon the hands are practically done away with. Very highly resisting staphylococci and typhoid bacilli, for example, are killed almost instantaneously by a solution of this product from one-fourth to one-half per cent. in strength. This product is also highly efficient in the case of germs forming bacteria, for example the highly resistant germs of anthrax will be killed by a four per cent. solution of this product in one or two hours. Stronger solutions act in a much shorter time.

Having thus described my invention, I claim:—

1. The method of making a disinfectant, consisting in heating oxalic acid, thereby driving off its water of crystallization, and mixing the dry powder thus produced with twenty-five per cent. of a forty per cent. aqueous solution of formaldehyde, substantially as described.

2. A disinfectant consisting of anhydrous oxalic acid combined with a solution of formaldehyde in such quantities that a solid product is formed, substantially as described.

3. A disinfectant consisting of oxalic acid mixed with twenty-five per cent. of an aqueous solution of formaldehyde and compressed into tablets, substantially as described.

In testimony, that I claim the foregoing as my invention, I have signed my name in presence of two witnesses, this first day of February 1907.

HANS SCHNEIDER.

Witnesses:
 WOLDEMAR HAUPT,
 HENRY HASPER.